Patented Sept. 6, 1938

2,129,285

UNITED STATES PATENT OFFICE 2,129,285

MANUFACTURE OF K-STROPHANTHINE-β

Jany Renz, Basel, Switzerland, assignor to the firm Chemical Works formerly Sandoz, Basel, Switzerland No Drawing. Application May 11, 1937, Serial No. 142,054. In Switzerland April 21, 1937

3 Claims. (Cl. 260—236)

It is known that in the seeds of strophanthus kombé besides the pure crystallized glucosides: cymarine (strophanthidine + cymarose) and k-strophanthine-β (strophanthidine + cymarose + 1 molecule of glucose) there exist still other cardioactive glucosides which contain several molecules of glucose (see the publication of W. A. Jacobs in the Physiological Reviews, 13, page 222 (1933)).

Now, I have found that these sugar-richer glucosides and in particular the glucoside obtainable according to a U. S. patent application Ser. No. 142,053 filed by me together with Arthur Stoll at the same day as the present one, which consists of strophanthidine, cymarose and 2 molecules of glucose and which has received the scientific denomination "k-strophanthoside", can be transformed by the action of enzyme preparations containing α-glucosidase into the known k-strophanthine-β. This object can be attained indifferently whether one starts from the pure, crystallized k-strophanthoside or whether one uses raw glucoside mixtures such as they are obtained by extraction of strophanthus kombé-seeds. The action of enzyme is performed in aqueous solution under such conditions as they are usual for enzymatic reactions. It is obvious that the operative conditions, particularly the temperature and pH-value must be adapted to the employed anzyme material.

The new process gives the possibility of obtaining from strophanthus kombé-seeds the k-strophanthine-β in an output which is several times greater than that hitherto realized. In accordance therewith the new process allows to obtain the main quantity of the present cardioactive glucosides in form of the k-strophanthine-β.

The following examples illustrate the invention:

Example 1

1 g. of pure crystallized k-strophanthoside (see the application above referred to) is dissolved in 30 ccm. of water, intermixed with 10 ccm. of yeast solution and 10 ccm. 1/3 molar-phosphate buffer of pH=6.8 and the mixture is maintained in the thermostat at 30° C. The yeast solution was obtained by neutral-autolyse of ordinary brewery yeast: 10 ccm. thereof correspond to 1 g. of yeast dry substance and are capable of dissociating a 5% maltose solution within 135 minutes through 50% thereof. After 65 hours the mass is shaken out three times with such quantities of chloroform-alcohol that the proportion of water to chloroform to alcohol is equal to 2:2:1. The chloroform fractions are concentrated to dryness and the residue is kneaded with some water. There are immediately crystallized out 0.4 g. of pure k-strophanthine-β. It results that 50% of the glucose-richer glucoside were transformed within this time into k-straphanthine-β.

Example 2

2 g. of raw, not crystallized k-strophanthoside which was prepared according to the aforesaid application by extraction of the fat liberated seeds of strophanthus kombé with chloroform-alcohol or aqueous alcohol and subsequent separation of the tannic substances with lead hydroxide and fractionation of the glucosides with chloroform-alcohol-water or alcohol and ether, are treated with 30 ccm. of a yeast solution in accordance with Example 1 at pH=6.8 and then worked up as described in said example. In this case, 1.1 g. of k-strophanthine-β can be isolated.

Example 3

1 kg. of strophanthus kombé seeds are extracted with chloroform-alcohol or aqueous alcohol and the concentrated extract is thoroughly treated with ether. After separation of the tannic substances with lead hydroxide of the raw glucoside mixture is dissolved in 2 litres of water and treated with 600 ccm. of a yeast solution from 60 g. of yeast (dry weight) in accordance with Example 1 at pH=6.8. After 120 hours the turbid solution is clarified by talc and the filtrate after addition of a saturated common salt solution is shaken out with chloroform to remove the cymarine as well as yellow colored greasy impurities. The clear yellow aqueous solution is mixed with half the volume of alcohol and by shaking out with chloroform the k-strophanthine-β is extracted. The treatment of the aqueous solution with chloroform-alcohol is still twice repeated and this each time in such a manner that the proportion of water to chloroform to alcohol is equal to 2:2:1. The isolated chloroform solutions are concentrated in vacuo. From the residue the k-strophanthine-β immediately crystallizes out after kneading the former with some water. The output of raw k-strophanthine-β from 1 kg. of the drug is of up to 25 g. and more. The k-strophanthine-β can be obtained in pure state by recrystallization from alcohol-water or hot water.

What I claim is:—

1. A process for the production of k-straphanthine-β, consisting in causing a enzyme preparation containing α-glucosidase to act upon glucosides from strophanthus kombé containing more than one molecule of glucose, and separating then the k-strophanthine-β by means of chloroform-alcohol.

2. A process for the production of k-strophanthine-β, consisting in causing a yeast solution containing α-glucosidase to act at a pH of about 6.8 upon glucosides from strophanthus kombé containing more than one molecule of glucose, then intermixing the solution with half the volume of alcohol, thereupon with the same volume of chloroform, separating the chloroform layer, extracting therefrom the k-strophanthine-β and repeating this treatment until no more k-strophanthine-β passes into the chloroform.

3. A process for the production of k-strophanthine-β, consisting in causing a yeast solution containing α-glucosidase to act at a pH of about 6.8 at moderately elevated temperature upon glucosides from strophanthus kombé containing more than one molecule of glucose, then intermixing the solution with half the volume of alcohol, thereupon with the same volume of chloroform, separating the chloroform layer, extracting therefrom the k-strophanthine-β and repeating this treatment until no more k-strophanthine-β passes into the chloroform.

JANY RENZ.